(12) United States Patent
Purnhagen et al.

(10) Patent No.: US 11,894,005 B2
(45) Date of Patent: *Feb. 6, 2024

(54) ENABLING SAMPLING RATE DIVERSITY IN A VOICE COMMUNICATION SYSTEM

(71) Applicants: Dolby Laboratories Licensing Corporation, San Francisco, CA (US); DOLBY INTERNATIONAL AB, Dublin (IE)

(72) Inventors: Heiko Purnhagen, Sundbyberg (SE); Leif Sehlstrom, Järfälla (SE); Lars Villemoes, Järfälla (SE); Glenn N. Dickins, Como (AU); Mark S Vinton, Alameda, CA (US)

(73) Assignees: DOLBY LABORATORIES LICENSING CORPORATION, San Francisco, CA (US); DOLBY INTERNATIONAL AB, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 16/685,016

(22) Filed: Nov. 15, 2019

(65) Prior Publication Data
US 2020/0082836 A1 Mar. 12, 2020

Related U.S. Application Data

(60) Continuation of application No. 15/867,318, filed on Jan. 10, 2018, now Pat. No. 10,482,891, which is a division of application No. 14/384,350, filed as application No. PCT/US2013/033228 on Mar. 21, 2013, now Pat. No. 9,905,236.

(Continued)

(51) Int. Cl.
H04M 3/56 (2006.01)
G10L 19/16 (2013.01)
(Continued)

(52) U.S. Cl.
CPC ............ G10L 19/03 (2013.01); G10L 19/002 (2013.01); G10L 19/16 (2013.01); G10L 19/26 (2013.01); H04M 3/56 (2013.01); H04M 3/568 (2013.01)

(58) Field of Classification Search
CPC ..... G10L 19/002; G10L 19/173; G10L 19/02; G10L 19/03; G10L 19/16; G10L 19/26;
(Continued)

(56) References Cited

U.S. PATENT DOCUMENTS

| 5,570,363 A | 10/1996 | Holm |
| 5,774,844 A | 6/1998 | Akagiri |

(Continued)

FOREIGN PATENT DOCUMENTS

| EP | 0957580 | 4/2008 |
| WO | 2012020090 | 2/2012 |

*Primary Examiner* — Jakieda R Jackson

(57) ABSTRACT

An audio communication endpoint receives a bitstream containing spectral components representing spectral content of an audio signal, wherein the spectral components relate to a first range extending up to a first break frequency, above which any spectral components are unassigned. The endpoint adapts the received bitstream in accordance with a second range extending up to a second break frequency by removing spectral components or adding neutral-valued spectral components relating to a range between the first and second break frequencies. The endpoint then attenuates spectral content in a neighbourhood of the least of the first and second break frequencies for thereby achieving a gradual spectral decay. After this, reconstructing the audio signal is reconstructed by an inverse transform operating on spectral components relating to said second range in the adapted and attenuated received bitstream. At small computational expense, the endpoint may to adapt to different sample rates in received bitstreams.

20 Claims, 5 Drawing Sheets

Related U.S. Application Data

(60) Provisional application No. 61/625,576, filed on Apr. 17, 2012, provisional application No. 61/614,582, filed on Mar. 23, 2012.

(51) Int. Cl.
  *G10L 19/26* (2013.01)
  *G10L 19/03* (2013.01)
  *G10L 19/002* (2013.01)

(58) Field of Classification Search
  CPC ... G10L 19/018; G10L 19/008; G10L 21/038; H04M 3/56; H04M 3/568
  USPC ............... 704/500–501, 503, 205–210, 268
  See application file for complete search history.

(56) References Cited

U.S. PATENT DOCUMENTS

| | | |
|---|---|---|
| 5,983,192 A | 11/1999 | Botzko |
| 6,092,041 A | 7/2000 | Pan et al. |
| 7,260,540 B2 | 8/2007 | Miyasaka |
| 7,275,036 B2 | 9/2007 | Geiger |
| 7,328,162 B2 | 2/2008 | Liljeryd |
| 7,454,353 B2 | 11/2008 | Sperschneider |
| 7,457,742 B2 | 11/2008 | Kovesi |
| 7,516,230 B2 | 4/2009 | Sperschneider |
| 7,548,853 B2 | 6/2009 | Shmunk et al. |
| 7,720,676 B2 | 5/2010 | Philippe et al. |
| 2002/0007273 A1 | 1/2002 | Chen |
| 2003/0063574 A1* | 4/2003 | Virolainen ............ H04M 3/568 370/260 |
| 2004/0252651 A1* | 12/2004 | Karlsen ................ H04L 65/103 370/264 |
| 2005/0027516 A1 | 2/2005 | Lee |
| 2005/0047793 A1 | 3/2005 | Butler |
| 2006/0280271 A1 | 12/2006 | Oshikiri |
| 2009/0226010 A1 | 9/2009 | Schnell |
| 2009/0234644 A1 | 9/2009 | Reznik |
| 2009/0240491 A1 | 9/2009 | Reznik |
| 2010/0094637 A1 | 4/2010 | Vinton |
| 2010/0286990 A1 | 11/2010 | Biswas et al. |
| 2012/0116780 A1 | 5/2012 | Tsuji |
| 2012/0166187 A1 | 6/2012 | Van Buskirk |

\* cited by examiner

ENABLING SAMPLING RATE DIVERSITY IN A VOICE COMMUNICATION SYSTEM

CROSS-REFERENCE TO RELATED APPLICATIONS

This application is a continuation of U.S. divisional application Ser. No. 15/867,318 filed Jan. 10, 2018 which is a divisional of U.S. patent application Ser. No. 14,384,350 filed Sep. 10, 2014 granted Feb. 27, 2018 as U.S. Pat. No. 9,905,236 which is a based on PCT International Application No. PCT/US2013/033228 filed Mar. 21, 2013 and claims priority to U.S. Provisional Patent Application Nos. 61/614,582 filed 23 Mar. 2012 and 61/625,576 filed 17 Apr. 2012, which are hereby incorporated by reference in their entirety.

TECHNICAL FIELD

The invention disclosed herein generally relates to audio communication technique and more precisely to a digital audio communication system supporting endpoints that apply non-uniform sampling rates. It is intended to apply the teachings of the invention to a voice or video conference network.

BACKGROUND

In an audio communication system with several endpoints (or clients), there is typically a recurring need to provide an audio signal being an additive mix of live signals originating from different endpoints and approximating the sound that would have been heard if all the communicating parties had been present in one location. This is generally desirable in voice conference systems and video conference systems. The literature contains descriptions, discussions and solutions to many problems arising in connection with such mixing, including reformatting, delay limiting, load reduction, synchronization, quality of service issues and the like.

The present invention is applicable particularly to communication systems with non-uniform sampling rates. An important example is systems where individual communication endpoints are allowed to encode and/or decode audio signals at a selectable sampling rate, such as 8 kHz (narrowband, as per ITU G.711), 16 kHz (wideband) and 32 kHz (super wideband). At critical sampling, this means that the spectral range, in which the spectral content is defined and encoded, is allowed to vary between different audio signals in the audio communication system. Because the sampling rate is allowed to vary, a system entity (e.g., conference server) that is responsible for generating the mix signal may be receiving input audio signals at different sample rates.

A straightforward though computationally costly way of enabling the mixing as such may be to decode the input audio signals before mixing and then re-encode the mix signal afterwards. Again, however, the endpoints may require different coding formats with different sampling rates, and so the re-encoding process may need to be repeated once for each unique format and sampling rate. Alternatively, the mixer outputs a basic signal which is then reformatted into whatever formats are required by the connected endpoints. Either way, this places considerable load on the server.

BRIEF DESCRIPTION OF THE DRAWINGS

Example embodiments of the invention will now be described with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DESCRIPTION OF EMBODIMENTS

I. Overview

Figure 1:
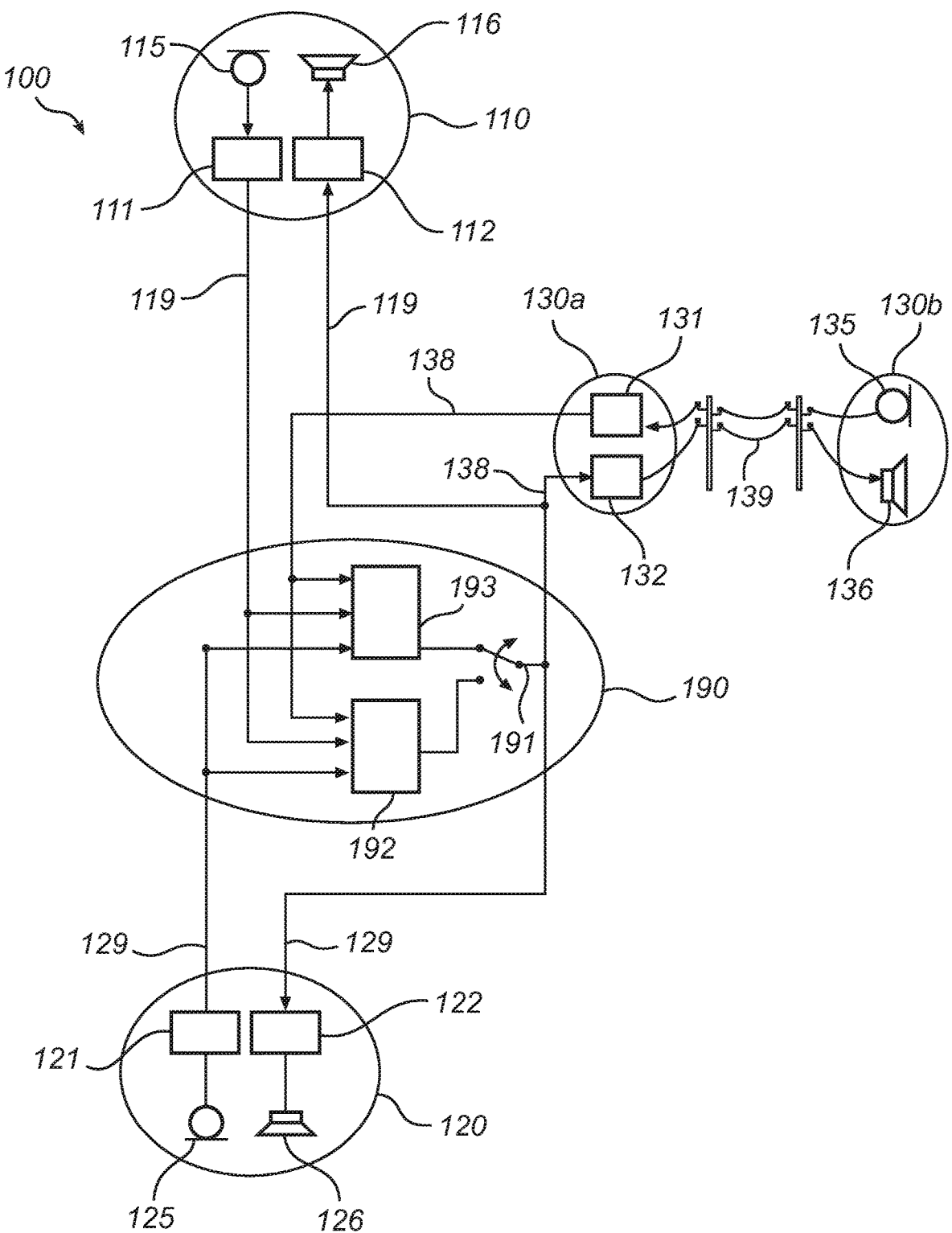
FIG. 1 shows an audio communication system with three endpoints.

It is an object of the present invention to propose methods and devices for entailing sampling rate diversity in an audio communication system. It is a further object to propose devices for an audio communication system in which communication nodes exchange audio data streams conformal to a sampling-rate independent bitstream format. It is a further object to facilitate mixing of audio streams associated with endpoints that accept audio data at non-uniform sampling rates and/or supply audio data at non-uniform sampling rates. It is a still further object to propose an audio communication endpoint capable of decoding a bitstream containing spectral components relating to a frequency range that is variable and configurable by a different communication node producing the bitstream, such as a communication server or a different endpoint.

Accordingly, example embodiments of the invention provide methods, devices and computer-program products with the features set forth in the independent claims.

In a first example embodiment, an audio communication endpoint is configured to process a received bitstream with spectral components representing spectral content of an audio signal. The spectral components relate to a first frequency range extending up to a first break frequency. Hence, frequencies in the first frequency range are associated with values of corresponding spectral components, while the spectral components above the first frequency—if any—are unassigned. The audio communication endpoint is communicatively connected to at least one further node in an audio communication network. The audio communication endpoints, server and network may be collectively referred to as an audio communication system in this disclosure.

The endpoint further includes a decoder for performing inverse transformation on a second range of spectral components and a pre-processor which when active adapts the received bitstream by either extending or restricting the frequency range for which the spectral components have been assigned values. Preferably, the pre-processor is arranged upstream of the decoder, so that this range extension or range restriction is performed on a frequency-domain representation. The frequency range for which the spectral components have been assigned values is adapted by the pre-processor in such manner that it coincides with the second frequency range, namely by removing component values (range restriction) or adding component values (range extension) between the upper bounds of the first and second frequency ranges. The added values may be neutral values corresponding to no excitation, such as zeros.

This example embodiment represents an alternative to upsampling or downsampling in order to change the frequency range (or equivalently, the sampling rate) of a signal. Put differently, this example embodiment proposes devices that communicate with one another in conformity with a sampling-rate independent bitstream format.

The inventors have realized, however, that the removal and addition of spectral component values may introduce a sharp spectral transition that may be produce audible artefacts upon inverse transformation, such as distortion products, pre-ringing and the like. To avoid such drawbacks, according to this example embodiment, the pre-processor is further adapted to attenuate spectral content in a neighbourhood of the cut-off frequency being the upper bound of either the first or second frequency range, whichever is lower. Hence, the cut-off frequency is where a spectral discontinuity may be expected to arise as a consequence of the range extension and range restriction.

If performed in the frequency domain, the attenuation may include multiplying the spectral components near the cut-off frequency by a sequence of downscaling factors causing the components to decrease gradually towards the cut-off frequency. The resulting spectral decay may be complete (i.e., roll-off down to zero) or partial. The spectral components affected by the downscaling may lie in a smaller or larger neighbourhood of the cut-off frequency. The neighbourhood may be single-sided, located entirely on one side of the cut-off frequency, or double-sided, located on both sides of the cut-off frequency. Preferably, the neighbourhood is left-sided, whereby spectral components relating to frequencies in an interval extending up to the cut-off frequency are affected by the attenuation.

Alternatively, the attenuation is performed in the time-domain, that is, after the audio signal has been reconstructed by way of the inverse transformation. The attenuation may be carried out by a low-pass filter, preferably one having a magnitude that falls off smoothly between the pass band and the stop band of the filter. Efficient analogue and digital implementations of low-pass filters are well known in the art.

In a further development of the first example embodiment, the attenuation is conditional upon characteristics of the spectral decay, that is, properties relative to the fall-off behaviour of spectral components pertaining to frequencies near the cut-off frequency. Indeed, as the inventors have realized, if spectral attenuation can be dispensed with, it is preferably omitted to reduce the risk of introducing new artefacts. In particular, duplicated low-pass filtrations will degrade the signal content, e.g., in terms of signal-to-noise ratio since the total amplitude is locally attenuated. As will be explained in what follows, cases where attenuation can be dispensed with typically arise when the pre-processor adds spectral components (range extension). Such situations typically do not arise in connection with frequency range restriction. To this end, the pre-processor is configured to characterize the spectral decay of the adapted received bitstream, that is, after the bitstream has undergone removal or addition of spectral components. It is envisaged that the pre-processor may characterize the spectral decay either by a direct appraisal or by considering an indirect indicator. A direct appraisal may include a search for discontinuities in the spectral component values or for segments with strong local variation. If a discontinuity (or strong local variation) is found, it may be expected that the spectral decay is not gradual. As the skilled person will realize, the notions of 'discontinuity' and 'strong variation'—corresponding to the cases requiring corrective action—may be quantified by listening experiments. A direct appraisal may further include estimating a local spectral decay rate on the basis of the spectral components.

Among indirect indicators, the processing history of an audio signal may allow conclusions as to whether the spectral decay is sufficiently gradual or whether it needs further attenuation. To this end, the bitstream may include an indicator evidencing that the spectral components or the underlying time representation of the signal has undergone a processing step that is one of low-pass filtering, spectral shaping, pre-sampling filtering (aiming to reduce the impact of aliasing) or other operations ensuring or contributing to a gradual spectral decay. The pre-processor may then be configured to read a value of the indicator and to conclude, based on the nature of the processing indicated, whether to carry out attenuation of spectral content or not.

An audio communication endpoint may further include an interface facing away from any lines connecting the endpoint to other nodes in the audio communication network. Such interface may be regarded as an outer boundary point of the audio communication network. The interface may be a user interface with transducers for outputting reproduced speech (and inputting natural speech), e.g., speakers (and microphones). Alternatively, it may be a network interface allowing the speech to be transmitted (or received) in encoded form over a network or transmission line after the processing by the endpoint is complete; transducers allowing user interaction may be arranged at the far end of the network or transmission line. In particular, the interface may act as a bridge to a public switched telephone network.

In a second example embodiment, the received bitstream contains an energy envelope relating to the full first frequency range. Some of the spectral components relating to the first frequency range are encoded by spectral band replication (SBR). Then, as is known per se in the art, a core range included in the first frequency range comprises spectral components with explicit values. The core range may be a subinterval of the first frequency range that lies below a cross-over frequency. Further, spectral components relating to frequencies in the first frequency range but outside the core range are derivable by transposition of the spectral components in the core range, wherein the energy envelope indicates the correct scale of the spectral component values obtained by transposition. In accordance with this example embodiment, the spectral components relating to frequencies in the first frequency range but outside the core range are derived prior to the attenuation of spectral content in a neighbourhood of the cut-off frequency. Addition of neutral-valued spectral components may be performed either before or after the attenuation, with no known impact on the result.

In a third example embodiment, an audio communication endpoint comprises an encoder and a transcoder. The communication endpoint may further have one or more of the features discussed in connection with the preceding embodiments, e.g. decoder, pre-processor and the like. However, the communication endpoint may also be a pure input node to the audio communication network. In this example embodiment, the encoder encodes an outgoing audio signal by means of a transform supplying spectral components relating to a third frequency range. The transcoder receives the spectral components from the encoder and outputs a bitstream that is conformal to a given bitstream format by which spectral components relating to frequencies up to a maximum frequency can be transmitted. In the bitstream, the transcoder encodes spectral components in the third frequency range and leaves spectral components relating to higher frequencies—if the bitstream format allows spectral components in a higher range—unassigned. This way, the audio communication endpoint will be able to communicate, by way of the bitstream, with other nodes in the audio communication network, e.g., with a server performing mixing and with different audio communication endpoints. Indeed, other communication endpoints in the audio communication network are able to process a received bitstream even if this contains spectral components lying outside the frequency ranges on which the decoders in these endpoints operate or if the spectral components in the bitstream do not completely fill the frequency range operated on.

In a further development of the third example embodiment, the endpoint further comprises a filter operable to attenuate spectral content in a neighbourhood of a third break frequency being the upper bound of the third frequency range. The filter may be a pre-sampling filter arranged upstream of the encoder, e.g., a low-pass filter. Alternatively, the filter may be a frequency-domain filter arranged downstream of the encoder. The transcoder is adapted to detect a condition of the filter (e.g., enabled, disabled) and assign a value to a pre-filtering field in the bitstream output from the endpoint, wherein the value is in accordance with the detected condition. Preferably, the pre-filtering field contains a value of the third break frequency. As discussed above, this may simplify subsequent processing of the bitstream and/or improve the quality of a final output.

In an example embodiment, an audio communication server is configured to send bitstreams to audio communication endpoints and to receive bitstreams from these endpoints. Each of the bitstreams may contain spectral components representing spectral content of an audio signal and is conformal to a predefined bitstream format allowing transmission of spectral components up to a maximum frequency. The endpoints may have properties similar to those described above. In particular, the spectral components in each bitstream received by the server (incoming bitstream) relate to a frequency range extending up to an input break frequency which is selectable by the corresponding audio communication endpoint. The number of endpoints may be three or more, whereby a given endpoint may require a mix of signals originating from two or more other endpoints. The server may be operable to output one outgoing bitstream, whereby all endpoints receive a common signal (e.g., by broadcast transmission over the network) informing them of the content of the ongoing audio communication. Alternatively, the server is operable to output a plurality of different outgoing bitstream (e.g., by unicast transmission over the network), possibly one for each receiving endpoint.

In this example embodiment, the audio communication server comprises a mixer and a selector. The selector controls the output of the server (or one of the outputs, if the server provides more than one output) insofar as the output is either a mix signal provided by the mixer or a signal that reproduces one of the inputs. (In an analogue signal processing situation similar to the present one, this may amount to forwarding the signal without substantive processing, e.g., after a mere amplification.) In the latter case, the outgoing bitstream may be a bitstream reproducing one of the incoming bitstreams. The outgoing bitstream may optionally undergo frequency range extension or frequency range restriction, as discussed above, so as to correspond to an output break frequency that the server is expected to supply to the endpoints in the system. Preferably, the mixer is configured to supply an outgoing bitstream produced in this manner in time segments where only one of the incoming bitstreams is active. Activity of an incoming bitstream may be ascertained by performing voice activity detection on the bitstreams; alternatively, the endpoint from which the bitstreams originate may supply metadata indicating the points in time at which audio activity begins and ends. Both the selector decision and the reproduction of the incoming bitstream may be accomplished without knowledge of the input break frequency (or sampling rate) of the incoming bitstream. This is made possible by the adaptability of the endpoints, i.e., their ability to handle any outgoing bitstreams from the server that are conformal with the bitstream format.

In one example embodiment, which may either be a further development of the preceding embodiment or practised on its own, the server adapts the break frequency (or mixer break frequency) in an outgoing bitstream in accordance with properties of the audio communication endpoints receiving the outgoing bitstream. For instance, the server may receive an output break frequency defining a frequency range on which a given audio communication endpoint operates to reconstruct an audio signal encoded by an outgoing bitstream. Gathering the output break frequencies from all endpoints, the server may be able to conclude that the mixer break frequency can be set to a smaller value than the maximum break frequency permitted by the predefined bitstream format. For instance, the mixer break frequency may be set to the maximum among the output break frequencies of the endpoints. This reduces the computational load on the server.

The dependent claims define example embodiments of the invention, which are described in greater detail below. It is noted that the invention relates to all combinations of features, even if the features are recited in different claims.

II. Example Embodiments

FIG. 1 is a generalized block diagram of an audio communication system 100 with one server 190 and three endpoints 110, 120, 130. In this example embodiment, each endpoint 110, 120, 130 comprises a microphone 115, 125, 135, a speaker 116, 126, 136 and associated processing means 111, 112, 121, 122, 131, 132. The first and second endpoints 110, 120 are connected to the server 190 via respective communication lines 119, 129 in an audio communication network. The third endpoint 130 is distributed spatially, wherein the processing means 131, 132 are arranged in a first portion 130a acting as interface between the audio communication network 138 (which may be a packet-switched network) on its left-hand side in the figure and a public switched telephone network (PSTN) 139 on its right-hand side. The PSTN 139 connect the first portion 130a to a second portion 130b, in which the microphone 135 and speaker 136 are arranged.

The endpoints 110, 120, 130 operate at different sampling rates. For instance, the third endpoint 130 associated with the PSTN 139 may operate at narrowband rate (8 kHz), while the first and second endpoints 110, 120 may operate at wideband or super wideband rates. Still, bitstreams are transmitted over the audio communication network in a uniform bitstream format. The bitstream format accommodates spectral components extending from a predefined minimum frequency (e.g., 20 Hz or 0 Hz) up to a variable break frequency, which may have any value between the minimum frequency and a predefined maximum frequency (e.g., 20 000 Hz) specified for the bitstream format. At critical sampling, the sampling rate is approximately equal to twice the first break frequency. The bitstream format allows the spectral components relating to frequencies up to the first break frequency to carry values. Spectral components relating to higher frequencies are unassigned. In this connection, it is advantageous to apply some type of entropy encoding (e.g., Huffman coding), by which the presence of unassigned spectral components in the bitstream occupies a limited amount of additional bandwidth in the audio communication network. The invention does not presuppose use of any particular transform; as one of many possible options, it may use a harmonic discrete transform with overlapping time windows and a time stride of the order of tens of milliseconds; the transform may be MDCT or DCT.

In the example embodiment, the bitstream format allows the first break frequency to be one of the predefined values 4 kHz, 8 kHz and 16 kHz, corresponding to sampling rates of about 8 kHz, 16 kHz and 32 kHz, respectively. Similarly, the endpoints 110, 120, 130 apply a second break frequency that is one of these three predefined frequencies. Hence, the first and second frequency ranges are unions of the frequency subbands [0, 4], [4, 8] and [8, 16] (unit: 1 kHz). The widths of the subbands are 1:1:2. This is however not an essential feature of this example embodiment of the invention.

In normal operation, the server 190 is configured to receive incoming bitstreams from each of the endpoints 110, 120, 130 and to generate a mix signal obtained by additive mixing of the signals represented by the incoming bitstreams. To achieve this, a mixer 192 within the server 190 decodes the incoming bitstreams partially or completely, in such manner that the spectral components representing audio signals originating from each endpoint 110, 120, 130 become available and can be operated on. As one example, the mixing may be additive and frequency bin-wise.

The mixer 192 may be configured to produce other combinations than a mix of all incoming signals. For instance, the mixer may be connected to the endpoints 110, 120, 130 via individual outgoing lines (not shown), so that a signal specifically adapted is supplied to each particular endpoint. If the mixer 192 is adapted to produce plural output signals, it may be desirable to exclude an incoming signal from the $m^{th}$ endpoint from an output signal intended in particular for the $m^{th}$ endpoint; this may be perceptually more comfortable for a user and may also reduce the likelihood of feedback instability.

The server 190 is configured to output the mix signal as a bitstream in accordance with the network-wide bitstream format, wherein it may set the first break frequency to any of 4, 8 and 16 kHz. The selection of a first break frequency value may depend on available computational resources in the server 190, network bandwidth, computational resources available for decoding in the endpoints 110, 120, 130, sampling rate of the incoming bitstreams and the like. However, because all endpoints 110, 120, 130 are able to decode bitstreams having an arbitrary one of these sampling rates, the server 190 it is not strictly required to adapt the signal to the second break frequency applied by particular endpoints. Indeed, if all endpoints 110, 120, 130 apply 4 kHz as second break frequency, there is typically little point in outputting a wideband or super wideband mix signal; if however there is diversity among different endpoints 110, 120, 130, then the individualization of the bitstreams is preferably handled on the endpoint side rather than on the server side.

In the example embodiment, the server 190 is configured to simplify the mixing in cases where only a single incoming bitstream is active (e.g., in terms of voice activity). In such cases, as symbolically illustrated by the selector 191, the server 190 may be configured to forward an unprocessed incoming bitstream as output. Indeed, in its upper position on the drawing, the selector 190 joins a switch 193 that forwards a selected one the incoming bitstreams on the one hand and the output point of the server 190 on the other hand. Preferably, the switch 193 is adapted to forward the active bitstream in case only one bitstream is active. The functionality of this operational mode is made possible by virtue of the adaptability of the endpoints 110, 120, 130, which as already discussed may decode a bitstream from the server 190 regardless of its sampling rate. Because the mixer 192 can be disabled while the selector 191 is in its upper position (bypass position), this operational mode implies a potential saving in computational load.

Figure 2:
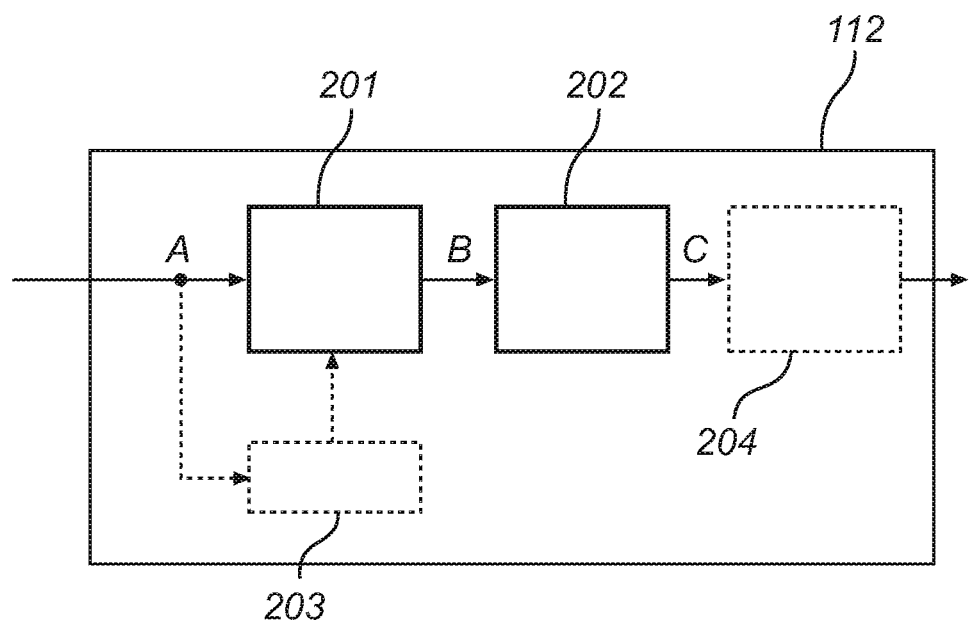
FIG. 2 shows a detail of an audio communication endpoint including a pre-processor and a decoder.

FIG. 2 illustrates details of the processing means 112 in an endpoint 110. The processing means 112 includes a pre-processor 201, a decoder 202 and an optional unit 203 responsible for parsing a pre-filtering field in the bitstream and forward this to the pre-processor 201. (Alternatively, the pre-processor 201 performs the parsing operation internally and the parsing unit 203 is omitted.)

Figure 3:
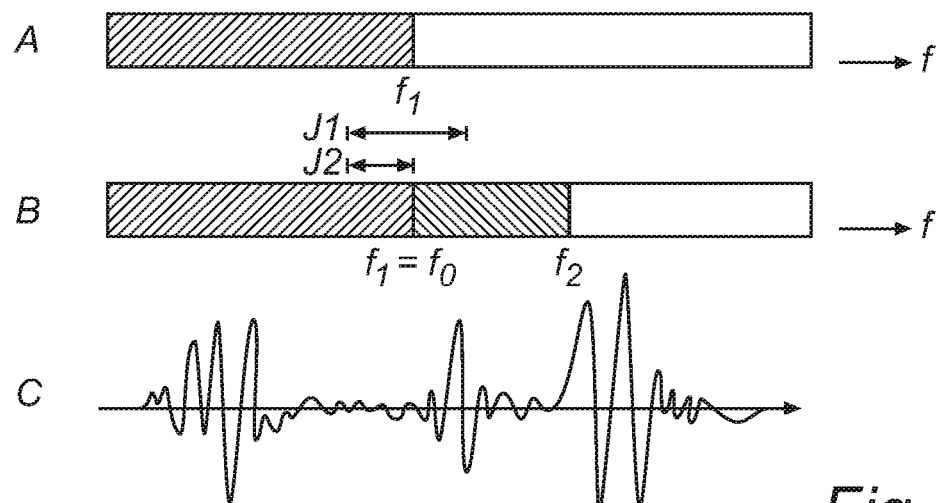
FIGS. 3 and 4 illustrate signals arising at three points in the endpoint shown in FIG. 2.

FIG. 3 contains an example of the signals arising in the processing means 112 during operation. Signal A illustrates the signal components in the received bitstream, out of which spectral components relating to frequencies up to a first break frequency f1 are assigned and higher-frequency spectral components are unassigned. Signal B illustrates the spectral components after the bitstream has been adapted in accordance with the second break frequency f2 applied by this endpoint 110. The spectral components in the range [f1, f2] have been assigned neutral values. Because the first break frequency f1 is relatively lower, it acts as cut-off frequency f0. The pre-processor 201 is adapted to attenuate spectral content in a neighbourhood of the cut-off frequency f0. FIG. 3 illustrates two possible neighbourhoods that may be selected for this purpose, namely a double-sided neighbourhood J1 and a single-sided neighbourhood J2. After the attenuation of the adapted received bitstream, the decoder 202 performs inverse transformation by operating on the spectrum components up to the second break frequency f2, whereby a time-domain representation of the signal is obtained, as illustrated by signal C in FIG. 3.

FIG. 2 illustrates a processing means 112 in which the spectral attenuation is performed on a frequency-domain representation of the signal. In the figure, there is further indicated an optional low-pass filter 204 arranged downstream of the decoder 202. The low-pass filter 204 is operable to attenuate spectral content in a neighbourhood of the cut-off frequency by operating on a time-domain representation of the signal. The low-pass filter 204 may be controlled by an output from the parsing unit 203, similarly to the pre-processor 201. Hence, the processing of the incoming signal is carried out in a distributed fashion: the pre-processor 201 performs range adaptation, the decoder 202 performs inverse transformation, and the low-pass filter 204 performs spectral attenuation. Alternatively, if direct estimation of the spectral decay is used, the pre-processor 201 performs the range adaptation and estimates the spectral decay; it then communicates to the low-pass filter 204, downstream of the decoder 202, whether the spectral decay is already sufficiently gradual or if spectral attenuation is to be activated.

Figure 4:
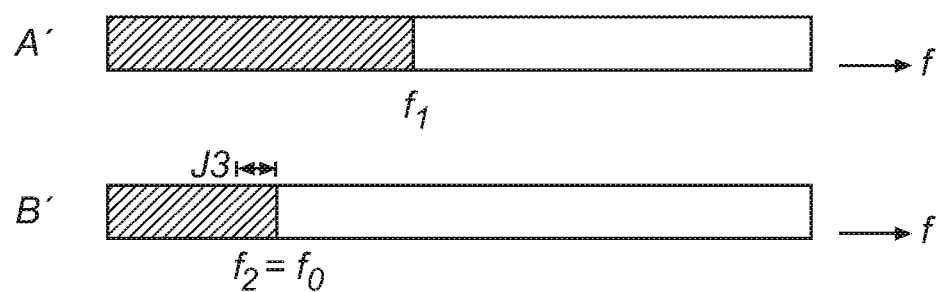

FIG. 4 illustrates a case where the second break frequency f2 is less than the first break frequency f1 and will therefore act as cut-off frequency, see signals A' and B', respectively extracted from locations A and B in the circuit of FIG. 2. The pre-processor 201 then attenuates spectral content in a neighbourhood of the cut-off frequency, such as in the frequency interval J3 in FIG. 4.

Figure 5:
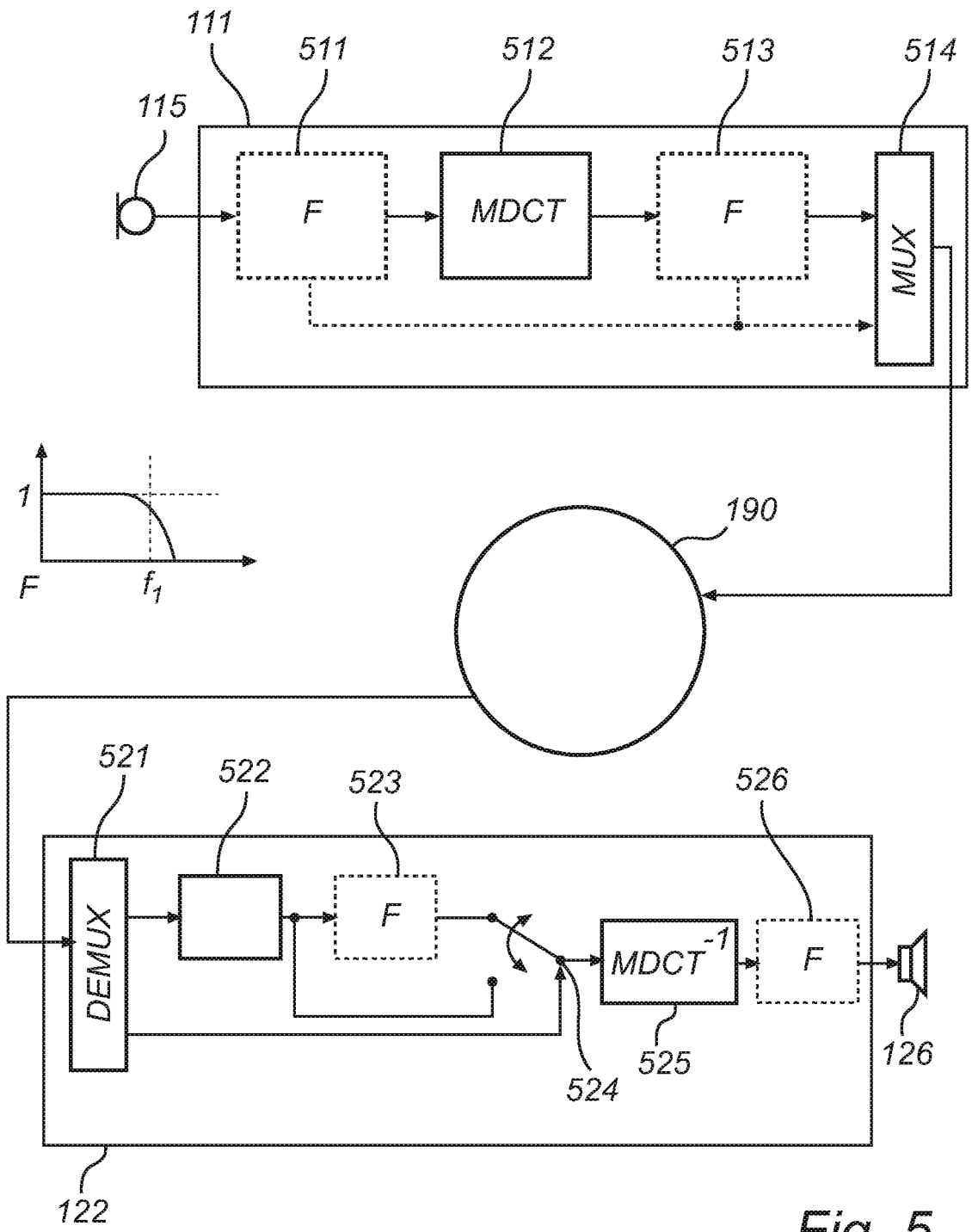
FIG. 5 shows a signal processing path in the audio communication system of FIG. 1.

FIG. 5 illustrates how an example embodiment of the invention avoids processing that would duplicate spectral attenuation, which may otherwise have a negative impact on the final signal quality. This figure shows a data path from an input microphone 115 in the first endpoint 110, via processing means 111 in the same endpoint, via the server 190, via processing means 122 in the second endpoint 120 and up to a speaker 126 arranged in the second endpoint 120. Spectral coefficients representing the signal obtained at the microphone 115 are obtained by an MDCT stage 512. In connection with this, there is an anti-aliasing filter 511, 513 located either upstream of the MDCT stage 512 (whereby the filtering proceeds in the time domain) or downstream of the MDCT stage 512 (whereby the filtering proceeds in the frequency domain). The anti-aliasing filter 511, 513 may have a magnitude response with respect to frequency as indicated in the figure, wherein the stop band extends from the first break frequency f1 and upwards. The present invention does not place any particular requirements on the characteristics of these anti-aliasing filters. However, when the output signal from the processing means 111 is to be transmitted over a given PSTN, it may be preferable to select a filter corresponding closely to any specifications for that PSTN, as this may ensure optimal quality in the circumstances. In the processing means 111, further, a multiplexer 514 produces a bitstream intended as final output to be transmitted to the server 190. The bitstream may include an indication that the signal has undergone anti-aliasing filtering. Optionally, the indication includes the value of the first break frequency f1. The indication may be localized in a pre-filtering field defined in the network-wide bitstream format.

In this example, the server 190 does not process the bitstream from the first endpoint 110 any further. Alternatively, the server 190 processes the bitstream in such manner that the value assigned to the pre-filtering field is conveyed to the downstream side.

In the processing means 122 within the second endpoint 120, a pre-processor 522 adapts the bitstream by adding neutral-valued spectral components, so that the assigned range matches the second break frequency that the second endpoint 120 applies. In order to fulfil its duties in the system, the processing means 122 does not necessarily have access to information concerning the spectral decay of the signal, that is, whether it is gradual or abrupt. To handle signals possibly having abrupt spectral decay, the processing means 122 is equipped with a low-pass filter 523, which is located upstream of an inverse MDCT stage 525 and which can be included in the signal processing path by actuating a selector 524, symbolically illustrated by a simple switch in FIG. 5. For the purpose of deciding whether to include the low-pass filter 523 in the processing path or not, a demultiplexer 521 extracts the value of the pre-filtering field in the bitstream and forwards the value to the selector 524. The value of the pre-filtering field may provide indirect information about the spectral delay. In the present case, it may be decided to omit the low-pass filtration in the second endpoint 120, since it is known that anti-aliasing filtration has been carried out in the first endpoint 110. This operation has probably ensured that the spectral decay is sufficiently gradual in order for noticeable artefacts not to arise.

FIG. 5 also suggests an alternative location for a low-pass filter 526, namely downstream of the inverse MDCT stage 525. The low-pass filter 526 in this position operates on a time-domain representation of the signal. Similar to the low-pass filter 523 in its first location, the time-domain low-pass filter 526 can be enabled and disabled in accordance with the value of a pre-filtering field in the bitstream. The value of the pre-filtering field can be extracted by the demultiplexer 521 and provided either directly to the low-pass filter 526 or to selection means controlling whether or not the low-pass filter 526 is to form part of the signal processing path. Hence, both in the receiving and the sending endpoint, the low-pass filtering can be carried out either in the time domain or the frequency domain. In the example embodiment shown in FIG. 5, there are no particular requirements on the characteristics of these low-pass filters 523, 526. However, considerations may be needed in an alternative example embodiment, wherein the processing means 122 is included in a spatially distributed endpoint similar to that endpoint 130 in FIG. 1 which is connected to a PSTN 139. Indeed, when the output signal is to be transmitted over a given PSTN, it may be preferable to occupy the relevant one of the filter positions 523, 526 in FIG. 5 by a filter which is in agreement with any specifications for that PSTN, as this may ensure optimal quality in the circumstances.

In a case where information concerning the processing history of the incoming bitstreams is available, the decision whether to apply spectral attenuation or not may be guided by rule of the type expressed in Table 1 below.

TABLE 1

|  | Output 8 kHz | Output 16 kHz | Output 32 kHz |
| --- | --- | --- | --- |
| Input 8 kHz | (1, —, —) | (F, 0, —) | (F, 0, 0) |
| Input 8 kHz (shaped) | (1, —, —) | (1, 0, —) | (1, 0, 0) |
| Input 16 kHz | (F, X, —) | (1, 1, —) | (1, F, 0) |
| Input 16 kHz (shaped) | (F, X, —) | (1, 1, —) | (1, 1, 0) |
| Input 32 kHz | (F, X, X) | (1, F, X) | (1, 1, 1) |
| Input 32 kHz (shaped) | (F, X, X) | (1, F, X) | (1, 1, 1) |

The entries in the table are triples (a, b, c), where a refers to the processing or content of the lower [0, 4] subband, b refers to the processing or content of the centre [4, 8] subband, and c similarly to the top [8, 16] subband. The notation has the meaning indicated in Table 2 below.

TABLE 2

| | |
| --- | --- |
| 0 | Present in output, obtained by padding with neutral values |
| X | Absent in output, removed from input |
| — | Absent in output and absent in input |
| F | Present in output and in input; spectral attenuation applied |
| 1 | Present in output and in input |

The cases where a signal is decoded without a change in sampling rate are straightforward. In decoding to a lower sampling rate, spectral attenuation is applied in the highest active subband. In decoding to a higher sampling rate, spectral attenuation is applied in the highest active subband except where it is known that the input has already undergone similar processing, e.g., spectrum shaping, anti-aliasing filtering, low-pass filtering, pre-filtering, as indicated by "shaped". For example, the case of decoding a shaped 16 kHz signal at 32 kHz does not require spectral attenuation, since there is already a soft roll-off in the centre subband. When the same signal is decoded at 8 kHz, however, the spectrum shaping, which was applied to the centre band, is of no use since the lower subband will be the highest one in the signal to be decoded; for this reason, spectral attenuation is preferably applied to this signal before it undergoes inverse transformation.

Figure 6:
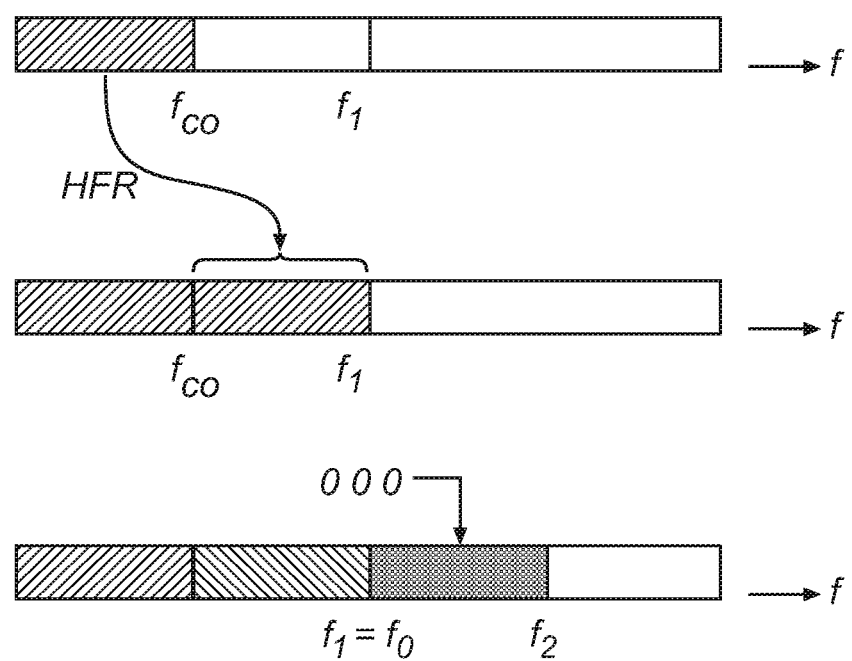
FIG. 6 illustrates different processing stages in the decoding of an audio signal based on spectral band replication.
Figure 7A:
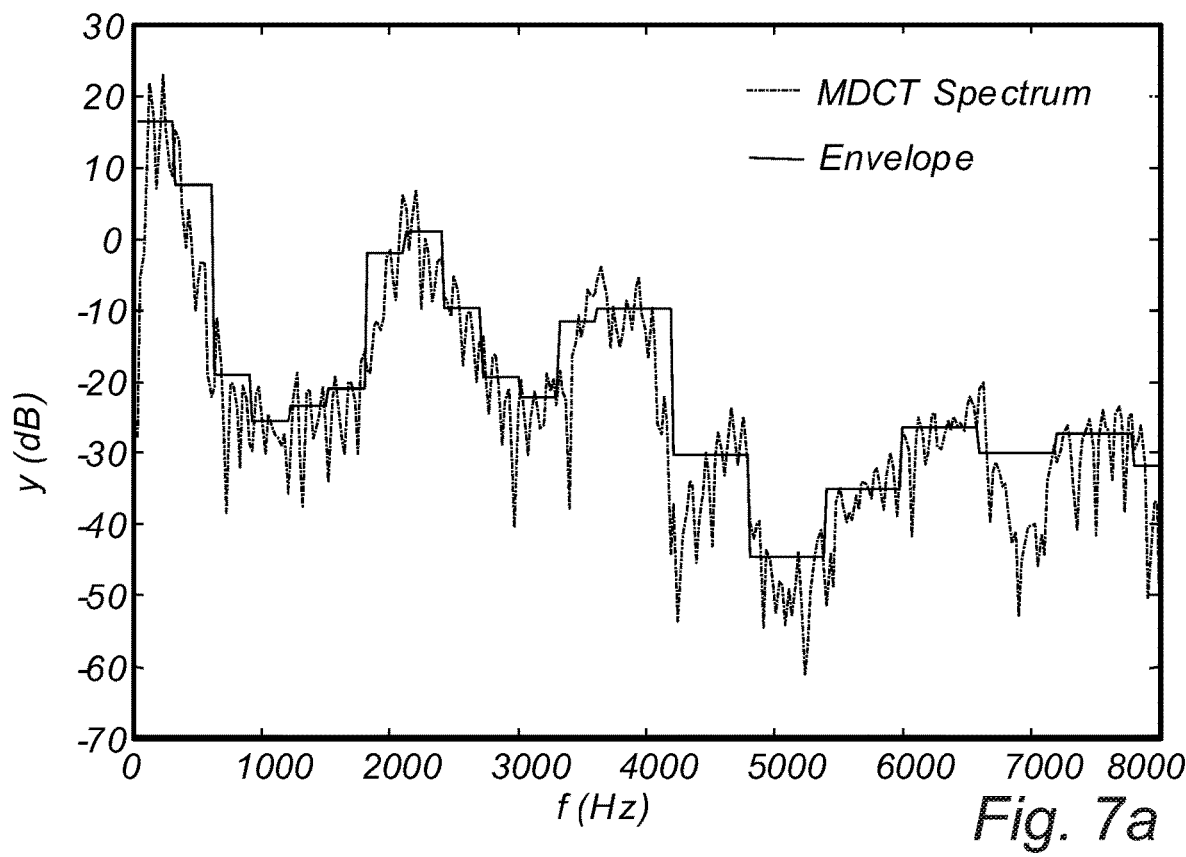
FIG. 7a and FIG. 7b illustrate the content of a bitstream representing an audio signal encoded by a spectral band replication technique.
Figure 7B:
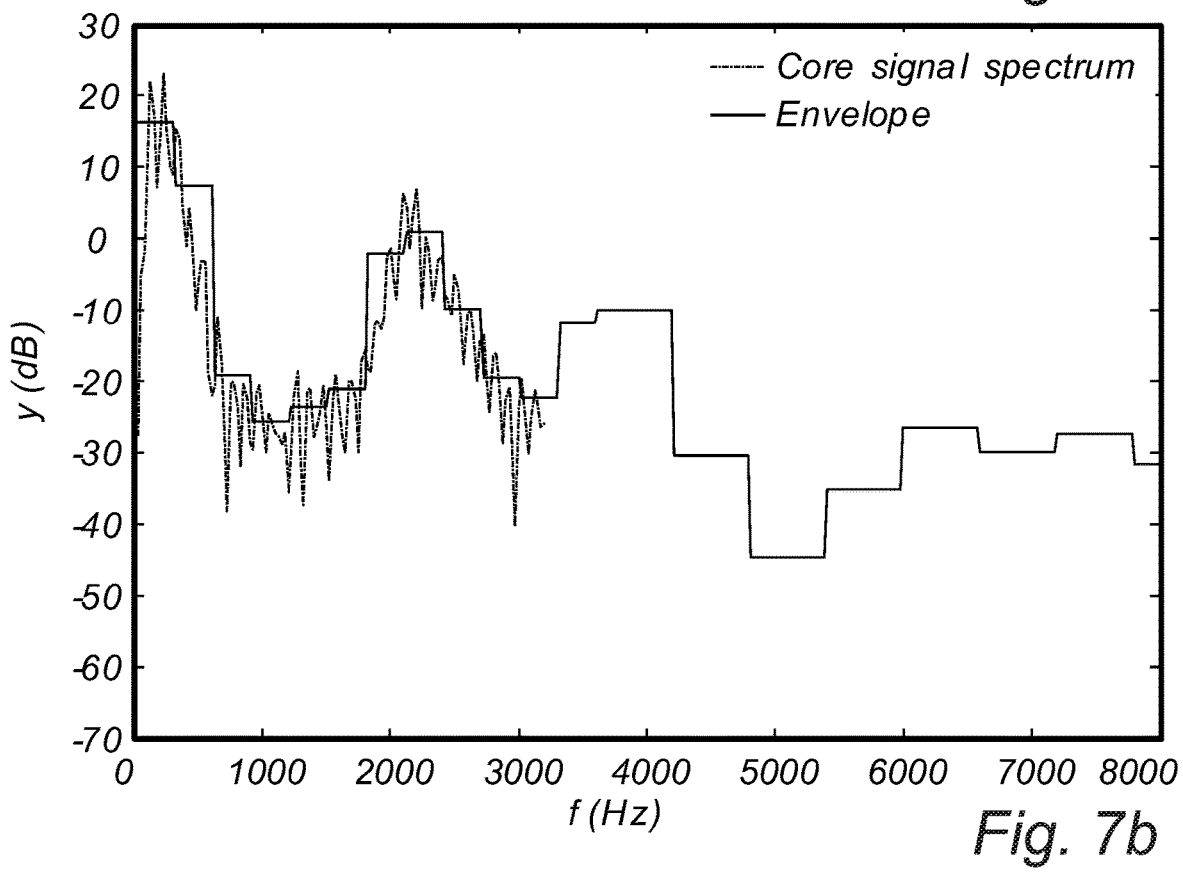

With reference now to FIGS. 6, 7a and 7b, an example will be discussed in which the present invention is combined with SBR. FIG. 6 illustrates three frequency-domain representations, corresponding to different processing stages in an audio communication system endpoint configured to process a bitstream for the purpose of outputting an audio signal via a speaker or the like. In FIG. 6, a core range extends from the minimum frequency up to a cross-over frequency $f_{co}$. Here, the spectral components have values assigned. The bitstream contains these values as well as an energy envelope relating to the full first frequency range. The first frequency range continues from the cross-over frequency $f_{co}$ up to the first break frequency f1, in which range the spectral components are not known exactly but may be reconstructed by transposing the component value from the core range and scaling them in their transposed positions in accordance with the energy envelope. FIG. 7a and FIG. 7b illustrates the SBR technique in more detail, in a case where the cross-over frequency $f_{co} \approx 3\ 200$ Hz and the first break frequency $f1 \approx 8\ 000$ Hz. That is, FIG. 7a shows MDCT spectrum coefficients and a corresponding energy envelope before encoding. The envelope is represented at lower resolution (with respect to frequency) than the MDCT spectrum coefficients. In this example, the envelope is piecewise constant by segments of about 300 Hz and then, from about 4 000 Hz onwards, varies by segments of about 600 Hz each. On the other hand, FIG. 7b, showing the same signal after SBR encoding, the MDCT spectrum coefficients above the cross-over frequency have been removed, which may reduce the bitrate down to about 50% of its original value.

Returning to FIG. 6, the upper portion illustrates the signal as extracted from the bitstream, wherein only spectral components in the core range have been assigned values. The second portion of FIG. 6 illustrates the SBR reconstruction process, wherein spectral components from the cross-over frequency $f_{co}$ up to the first break frequency f1 are assigned their values by transposition of values of spectral components relating to frequencies below the cross-over frequency $f_{co}$. The transposition, which may for instance be of a copy-up, single-sideband or harmonic type, is preferably accompanied by rescaling in accordance with the energy envelope (not shown) extracted from the bitstream. To obtain the signal illustrated by the lower portion of FIG. 6, a zero-padding operation similar to the one described in connection with the preceding example embodiments is applied.

If the signal has been obtained by sampling preceded by low-pass filtering (as may be explicitly encoded in a field in the bitstream format to facilitate a decision not to attenuate), it may be expected that the signal illustrated in the lowest portion may in this case proceed to inverse transformation without any preliminary spectral attenuation. Indeed, even though the bitstream does not carry explicit values of the spectral components in a neighbourhood of the first break frequency f1 (which plays the role of cut-off frequency f0), the spectral decay is conveyed by the energy envelope. It is noted that this is likely not the case for the signal shown in FIG. 7 and FIG. 7b, since the spectrum has a substantially constant, moderately high value from about 6 000 Hz onwards. Hence, it may be appropriate to attenuate the spectral content in this range to make it gradually decay towards 8 000 Hz before the signal undergoes inverse transformation.

III. Equivalents, Extensions, Alternatives and Miscellaneous

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:
1. A method of exchanging bitstreams, comprising:
receiving, by a server, a plurality of incoming bitstreams, each of the incoming bitstreams including spectral components representing spectral content of an audio signal and metadata indicative of audio activity in the incoming bitstreams, each of the incoming bitstreams being conformal to a predefined bitstream format allowing transmission of spectral components up to a maximum frequency, wherein the spectral components in each incoming bitstream relate to a frequency range extending up to a selectable input break frequency that is selectable by one or more communication endpoints;
generating, by the server, based on the incoming bitstreams, a particular bitstream representing an audio signal being an additive mix of at least one of the incoming bitstreams;
selecting, by the server, an outgoing bitstream from the particular bitstream or a bitstream reproducing an active one of the incoming bitstreams; and monitoring, by the server, the incoming bitstreams for audio activity according to the metadata in the incoming bitstreams, wherein the monitoring includes:
in response to having exactly one active incoming bitstream, outputting, by the server, a particular outgoing bitstream reproducing the active incoming bitstream, and
in response to having more than one active incoming bitstream, outputting, by the server, the audio signal being the additive mix of the at least one of the incoming bitstreams,
wherein the server includes one or more computer processors, and
wherein the metadata indicative of audio activity in the incoming bitstreams is determined by a device other than the server.

2. The method of claim 1, further comprising:
receiving, by the server, an output break frequency defining a frequency range; and
generating, by the server, a bitstream containing spectral components relating only to a frequency range extending up to a mixer break frequency being less than or equal to the least of the output break frequencies received by the server.

3. The method of claim 1, further comprising partially decoding the plurality of incoming bitstreams.

4. The method of claim 1, further comprising completely decoding the plurality of incoming bitstreams.

5. The method of claim 1 further comprising performing mixing, by the server, that is additive and frequency bin-wise.

6. The method of claim 1, further comprising excluding, by the server, an incoming bitstream of the plurality of incoming bitstreams to reduce a likelihood of feedback instability.

7. The method of claim 1, further comprising disabling a portion when the server outputs the bitstream reproducing the active one of the incoming bitstreams.

8. The method of claim 2, wherein the output break frequency is one of 4 kHz, 8 kHz and 16 kHz.

9. A system comprising:
one or more processors; and
a non-transitory computer-readable medium storing instructions that, upon execution by the one or more processors, cause the one or more processors to perform operations comprising:
receiving a plurality of incoming bitstreams, each of the incoming bitstreams including spectral components representing spectral content of an audio signal and metadata indicative of audio activity in the incoming bitstreams, each of the incoming bitstreams being conformal to a predefined bitstream format allowing transmission of spectral components up to a maximum frequency, wherein the spectral components in each incoming bitstream relate to a frequency range extending up to a selectable input break frequency that is selectable by one or more communication endpoints;
generating, based on the incoming bitstreams, a particular bitstream representing an audio signal being an additive mix of at least one of the incoming bitstreams;
selecting an outgoing bitstream from the particular bitstream or a bitstream reproducing an active one of the incoming bitstreams; and
monitoring the incoming bitstreams for audio activity according to the metadata in the incoming bitstreams, wherein the monitoring includes:
in response to having exactly one active incoming bitstream, outputting a particular outgoing bitstream reproducing the active incoming bitstream, and
in response to having more than one active incoming bitstream, outputting the audio signal being the additive mix of the at least one of the incoming bitstreams,
wherein the metadata indicative of audio activity in the incoming bitstreams is determined by a device other than the system.

10. The system of claim 9, the operations further comprising:
receiving an output break frequency defining a frequency range; and
generating a bitstream containing spectral components relating only to a frequency range extending up to a mixer break frequency being less than or equal to the least of the output break frequencies received by the system.

11. The system of claim 9, the operations further comprising partially decoding the plurality of incoming bitstreams.

12. The system of claim 9, the operations further comprising: completely decoding the plurality of incoming bitstreams.

13. The system of claim 9, the operations further comprising performing additive and frequency bin-wise mixing.

14. A non-transitory computer-readable medium storing instructions that, upon execution by a server including one or more processors, cause the one or more processors to perform operations comprising:
receiving a plurality of incoming bitstreams, each of the incoming bitstreams including spectral components representing spectral content of an audio signal and metadata indicative of audio activity in the incoming bitstreams, each of the incoming bitstreams being conformal to a predefined bitstream format allowing transmission of spectral components up to a maximum frequency, wherein the spectral components in each incoming bitstream relate to a frequency range extending up to a selectable input break frequency that is selectable by one or more communication endpoints;
generating, based on the incoming bitstreams, a particular bitstream representing an audio signal being an additive mix of at least one of the incoming bitstreams;
selecting an outgoing bitstream from the particular bitstream or a bitstream reproducing an active one of the incoming bitstreams;
monitoring the incoming bitstreams for audio activity according to the metadata in the incoming bitstreams, wherein the monitoring includes:
in response to having exactly one active incoming bitstream, outputting a particular outgoing bitstream reproducing the active incoming bitstream, and
in response to having more than one active incoming bitstream, outputting the audio signal being the additive mix of the at least one of the incoming bitstreams,
wherein the metadata indicative of audio activity in the incoming bitstreams is determined by a device other than the server.

15. The non-transitory computer-readable medium of claim 14, the operations further comprising:

receiving an output break frequency defining a frequency range; and generating a bitstream containing spectral components relating only to a frequency range extending up to an mixer break frequency being less than or equal to the least of the output break frequencies received.

16. The non-transitory computer-readable medium of claim 14, the operations further comprising partially decoding the plurality of incoming bitstreams.

17. The non-transitory computer-readable medium of claim 14, the operations further comprising completely decoding the plurality of incoming bitstreams.

18. The method of claim 1, wherein the metadata differs from data of the incoming bitstreams.

19. The method of claim 1, wherein the metadata indicates points in time in which audio activity begins and ends in the incoming bitstreams.

20. The method of claim 1, wherein the metadata for a given incoming bitstream is generated by a given communication endpoint of the one or more communication endpoints.

\* \* \* \* \*